INVENTOR
HANS KYBURZ

BY Wenderoth, Lind & Ponack
ATTORNEYS

# United States Patent

Kyburz

[15] 3,671,060
[45] June 20, 1972

[54] INSULATING FITTING AND METHOD FOR MANUFACTURING

[72] Inventor: Hans Kyburz, Bruggweg 40, Dornach, Switzerland

[22] Filed: Feb. 27, 1970

[21] Appl. No.: 14,972

[52] U.S. Cl. .................. 285/54, 29/445, 29/507, 29/523, 285/328, 285/354, 285/369, 285/382, 285/382.4
[51] Int. Cl. .................................................. F16l 11/12
[58] Field of Search .......... 285/382, 382.4, 328, 54, 369, 285/354; 29/507, 523, 445; 77/72

[56] References Cited

UNITED STATES PATENTS

| | | | |
|---|---|---|---|
| 3,331,621 | 7/1967 | Bagnulo | 285/55 x |
| 1,955,642 | 4/1934 | Laughlin | 285/328 x |
| 3,372,452 | 3/1968 | Firth et al. | 29/523 x |
| 2,923,181 | 2/1960 | Grage | 77/72 |
| 634,848 | 10/1899 | Courson | 285/54 |
| 2,874,981 | 2/1959 | Brady | 285/328 x |
| 3,503,633 | 3/1970 | Braun et al. | 285/54 |

FOREIGN PATENTS OR APPLICATIONS

| | | | |
|---|---|---|---|
| 435,886 | 10/1967 | Switzerland | 285/54 |

*Primary Examiner*—Dave W. Arola
*Attorney*—Wenderoth, Lind & Ponack

[57] ABSTRACT

An article of manufacture and a method of manufacturing electrically insulated metal pipe couplings both of the fixed or separable union type. The couplings may be insulated at one or both ends. The couplings includes an external body member component and a separate internal sleeve or thimble-like component which has an insulation layer interposed between radial and axial wall portions of said external and internal members, which insulation layer may be of generally preformed cup-like shape or by use of suitable jigs, to hold the respective body members it may be injected in a fluid state therebetween. The radial peripheries of the corresponding body parts are complementally tapered so as to preclude disassembly of the unitary finished coupling. When using pre-shaped complementary components of generally circular form, rather than various polygonal shapes, the complementally shaped surfaces of the metal components which abut against the sandwiched-in insulating layer are pretreated mechanically by special knurling or surface grooving, and possibly also chemically treated with a special solvent, thereby assuring an aggressively tight and leak proof seal when assembled which will resist torsional separation. The method of assembly for one form which includes an external socket member having an outer deformable peripheral wall is to have it in initially sufficiently open condition and placing it upon the reversely tapered internal member in nesting relationship with the insulation piece and internal socket component, and while applying an axial assembly force, simultaneously applying a radial compressing force to the deformable peripheral wall to form it tightly around the internal tappered portion to form a sealed insulated coupling. The insulation preferably projects axially beyond the joined components and also is radially spaced from the main portion of the socket component. Another form of assembly utilizes an internally inserted tool to apply a radially outwardly directed expansion force to sealingly seat the internal coupling member and insulating member tightly into unitary assembly with the external jacket or main coupling body. In still other forms the internal component may be formed with progressively thickened or inwardly tapered end spigot portions which are adapted to be forced radially outwardly by an internal expansion tool against an interposed insulation layer strategically placed therebetween, while applying an axial assembly force to assure a completely tight sealed assembly of both the radial and axial wall portions of the insulating member between the corresponding portions of the external and internal metallic coupling components. The coupling embodying an external jacket or sleeve preferably will have two such internal components assembled therewith in opposite ends. The method of assembly is carried out preferably in two steps including applying a slight initial expansion to the internal member of the assembled components in a slightly warmed up condition of about 80°, and the subsequent step is completing the expansion at approximately the normal room temperature.

5 Claims, 15 Drawing Figures

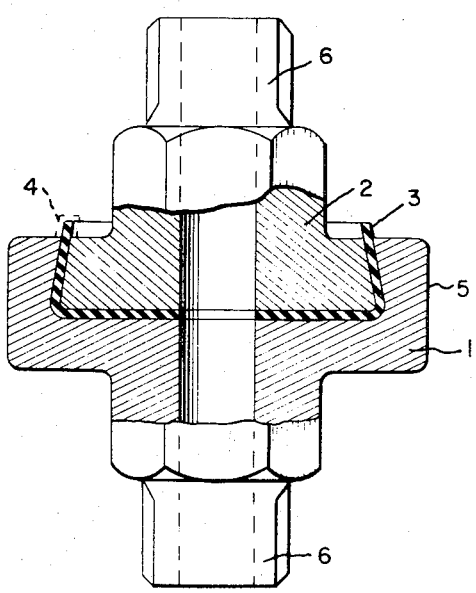

INVENTOR
HANS KYBURZ
BY
Wenderoth, Lind & Ponack
ATTORNEYS

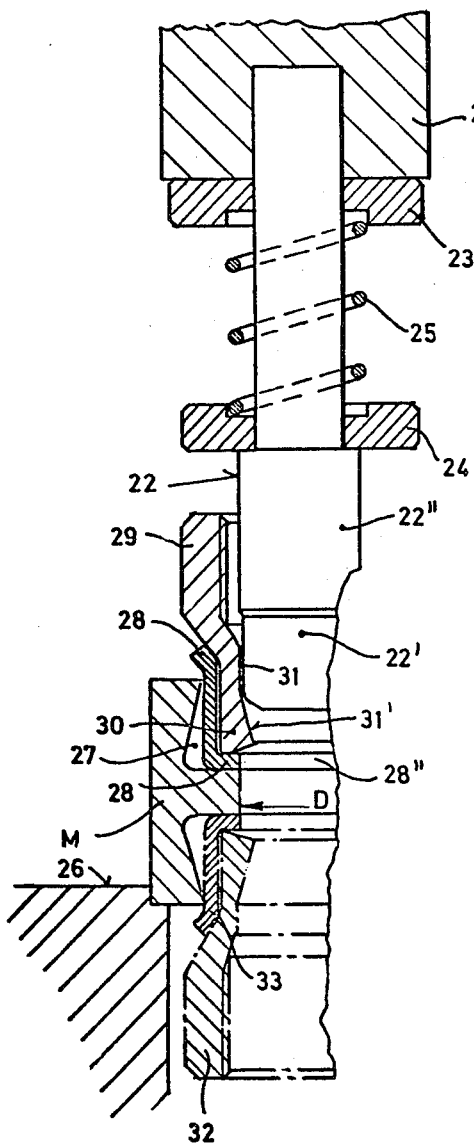
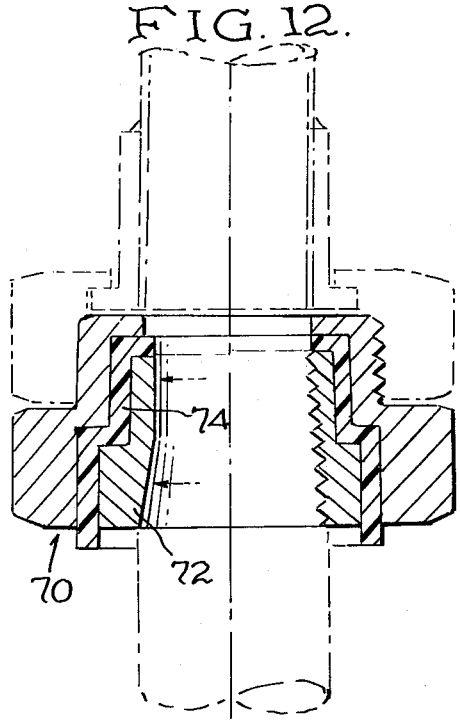
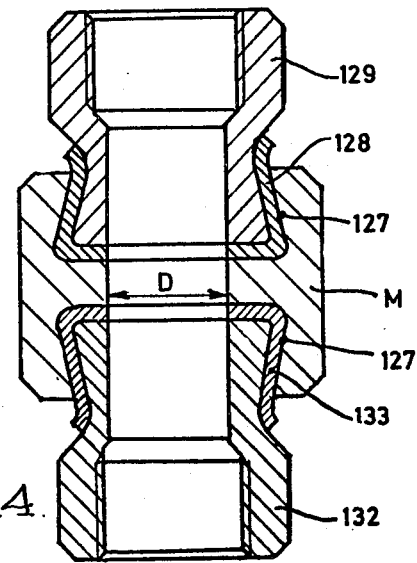
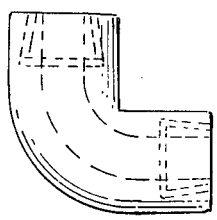

INSULATING FITTING AND METHOD FOR MANUFACTURING

The present invention relates to insulating pipe couplings and methods of making same, which couplings or insulating fittings may be of various forms for electrically separating lengths of metal pipe lines as is necessary, for example, in fuel lines for liquid and gaseous media between a tank and a burner system, or in delivery statations between tank vehicles and pipe lines, in order to avoid undesirable flow of electric currents or charges from the one to the other part of the installation. Such flow is possible through lighting discharges, static charges on vehicles, defective insulation of electric cables, or through stray currents which could endanger parts of the installation and the operation thereof.

According to the invention, the basic portion of the insulating fitting for electrically separating parts of metal pipe lines comprises two generally radially nestable coupling bodies and a layer of insulation of preferably generally preshaped cup-like form arranged between them in which the bodies are pretreated and so interconnected together with the intermediate insulating layer by mechanically applied prestressing forces that a rigid coupling results, the body parts of which are no longer separable without destruction. In producing the fitting, the insulating layer in solid or plastically deformable preformed (or sheet) condition can be brought between metallic coupling bodies, the insulation contacting surfaces of the metal bodies being mechanically and/or chemically pretreated to ensure good contact between the metal and insulating layer.

According to the invention, the manufacturing process of such an insulating fitting is characterized by the roughening of at least a portion of the respective longitudinally oriented metal sections of the fitting component portions adapted to engage the finished intermediate insulating layer, and may be further characterized by the insertion of the prefabricated insulating member into a ball or socket portion of the larger, first fitting component, or by the setting up of the said insulating member on the substantially cylindrical surface of the smaller, second fitting section having a central bore therethrough, which section is adapted to be situated radially and axially within the interposed intermediate insulating layer, by the introduction of said second fitting component into the socket in the first fitting component; and with the pressing of the complete second fitting component against the complemental axially and radially situated portion on the insulating member, and by the dilatation and radial expansion of the central bore in the second fitting component.

The invention will be further described with reference to illustrative examples shown in the accompanying drawings, wherein.

Figure 8:
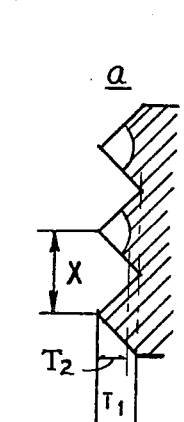
Figures 7, 10, 11:
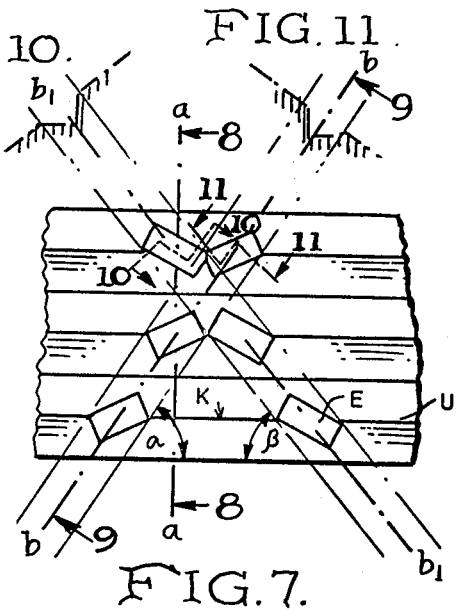
Figure 9:
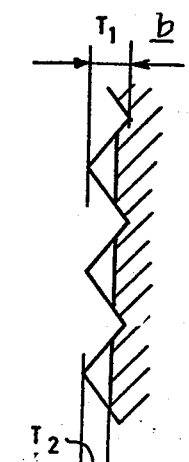

FIGS. 7-11 are details of the surface roughness prepared on the coupling components which engage the insulating piece therebetween, wherein FIG. 7 is an enlarged fragmentary elevational view of one series of knurlings; FIG. 8 is a transverse fragmentary cross-section taken substantially on line 8—8 of FIG. 7; FIG. 9 is a similar cross-section taken substantially on line 9—9 of FIG. 7; FIGS. 10 and 11 are cross-sectional views shown in interrupted lines as seen substantially on lines 10—11 and 11—11, respectively, of FIG. 7;

FIG. 12 is a composite cross-sectional view of another fitting for adapter use in connecting threaded pipe to soldered tubing;

FIG. 13 is a longitudinal cross-sectional view depicting the relative construction and method of assembly of still a different form of insulated coupling as shown in FIG. 14; FIG. 14 is a similar cross-sectional view of the finished double insulating unitary coupling made by the method shown in FIG. 13;

and FIG. 15 is an elevational view of an elbow type fitting embodying the invention hereof.

Figure 1:
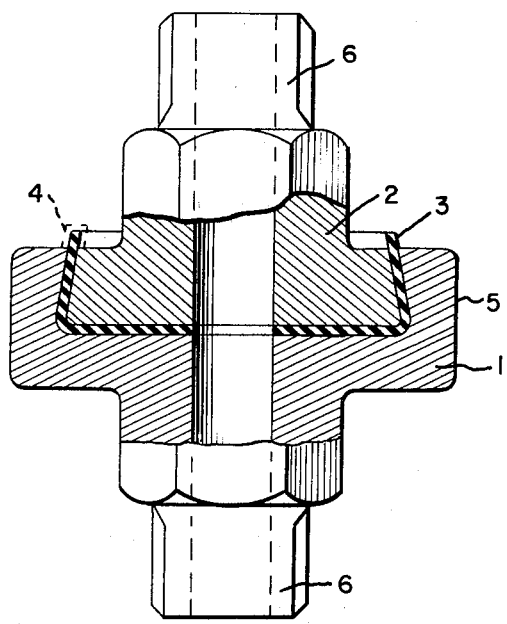
FIG. 1 is a side view of one composite form partly in cross-section, which is essentially a unitary completed fitting.

As shown in FIG. 1, the insulating fitting comprises two interjoined coupling bodies 1 and 2 which may generally be considered of the bell and spigot type, for incorporation in a pipe line, and having a layer of insulation 3 arranged between them to prevent passage of electrical current between the bodies. The bodies 1 and 2 are so integrally connected with and by means of the intermediate insulating layer 3 by mechanically applied prestressing forces that a rigid unitary coupling results, the parts of which are no longer separable without destruction. In order to reduce the risk of surface electrical leakage, means are provided on or projecting from the external surface of the fitting to lengthen the surface leakage path, wherein the main feature resides in the insulating layer 3 projecting axially beyond the metallic parts 1 and 2 and being radially spaced from the hub 2a of body 2 to form an extended leakage parth 4 of sufficient length, as a rule 4 to 6 mm. To avoid formation of a surface leakage path within the bore, precautionary steps are taken, for example, by broaching or reaming the bore, to prevent the deposition and build-up of suspended particles in the medium flowing within the pipe line on the wall of the bore, particularly in the region of the insulating layer.

The electrical insulating layer, made of a heat- and ageing-resistant, pressure-resistant, surface-leakage-resistant electrical insulating material, during assembly can be positioned in the form of a preshaped cup-like body either adjacent to or within the fitting, into a position between the two external coupling bodies 1 and 2 before the application of the prestressing forces for connecting the parts of the fitting together; or the insulation material also can be injected or poured in a plastically deformable condition between the metal parts held by suitable jig devices. The combined radial and axial prestressing forces so far as necessary are applied, while maintaining an initial axial assembly force of the parts, by compressing a socket portion 5 of the lower body 1 against the interposed insulating layer 3 and through this against the outer tapered periphery of the upper body 2. As shown in the section of FIG. 1, the cooperating portions of the parts 1, 2 and 3 are complementally tapered so that they are permanently united to preclude axial separation while the applied compression ensures fluid-tight engagement. To ensure a satisfactory aggressive contact between metal and insulating material, the metal parts may be preheated and/or surfacewise mechanically and/or chemically pretreated with striations or knurling, to be described in more detail, and/or with a suitable solvent, adhesive, or sealing material, respectively. When the fitting is made with a preformed insulating layer in a relatively solid condition, if necessary, it also can be treated with a suitable solvent, adhesive, or sealing material. The insulation member 3 for this embodiment comprises a generally polygonal shaped annular wall 3a and a transverse planar base wall 3b, preferably preformed to fit within the corresponding shaped recess of the bell-like body member 1.

The radial and axial cup-like deformable flange 5 of body member 1 in its pre-assembled form is preferably disposed in a slightly radially outward manner to more readily facilitate insertion or assembly of the insulation sheet member 3 and socket piece 2. During the assembly, then the mechanically applied compressive force applied to wall 5 effects the desired final shaping and interlocked formation with the reversely tapered piece 2.

Contact zones between metal parts and an insulating material which are resistant up to a temperature of about 150° C. enables the fitting to be used in pipelines or conduits handling a flowing medium which is constantly at a temperature of about 100° C.

In order to enable the fitting to be used with any type of pipe line, the zones 6, 6' by which the fitting is connected in a pipe line can be constructed so that they have integral connecting means such as male or female screw threads, clamping means or smooth sweat-fitting surfaces prepared for soldering. Indeed the bodies can be constructed to allow for all three types of connection.

Figure 2:
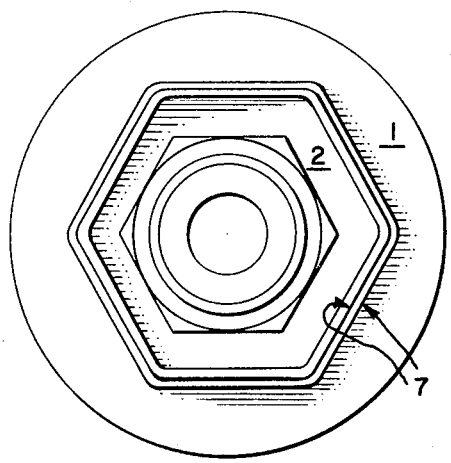
FIG. 2 is a plan of the fitting shown in FIG. 1.

In order to make the fitting resistent to the torsion which often arises to a considerable degree in the installation of the fitting, relative rotation between the two coupling bodies is prevented by polygonal (or other non-circular or knurled) zones of contact 7 with the insulating material as shown for example in FIG. 2.

Figure 3:
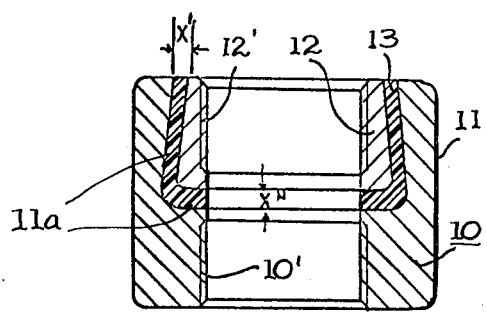
FIGS. 3 and 4 are cross-sectional and end elevational views, respectively, of another form of unitary insulating fitting.
Figure 4:
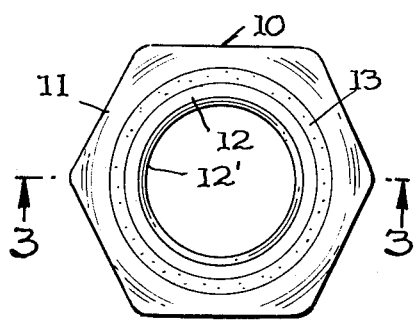

Referring next to the form of FIGS. 3 and 4, the basic insulating fitting is embodied within one half of a single piece pipe connector designated 10. Connector 10 comprises the one piece external sleeve member 11, as shown at 11a. The internal member 12 is of generally annular sleeve-like form having generally a round, oval or polygonal outer periphery when viewed in cross-section, and after the injection in plastic form, or the interpositioning of a preformed insulating member 13, internal member 12 is expanded radially, while applying an axially directed force to seat member 12 within 13, by an internally inserted tool so as to assure a tight aggressive assembly of all three components. Particularly where the member 11 with recess 11a and member 12 are of the generally circular shape, the surfaces of the respective parts which engage with the insulating piece are preferably knurled or otherwise suitably roughened to assure the desired aggressive assembly. The screw threads 10' and 12' may be cut or otherwise suitably formed before or after the said assembly.

The thickness of the radial and the axial portions of intermediate insulating layer 13 may be selected of equal or unequal size. In order to lead the electrical current in the case of overvoltage over the external surface and not through the medium, the thickness of the axial portion $X'$ is preferably selected smaller than that of the radial portion $X''$. The danger of an explosion can thus be met in an effective manner.

Figure 5:
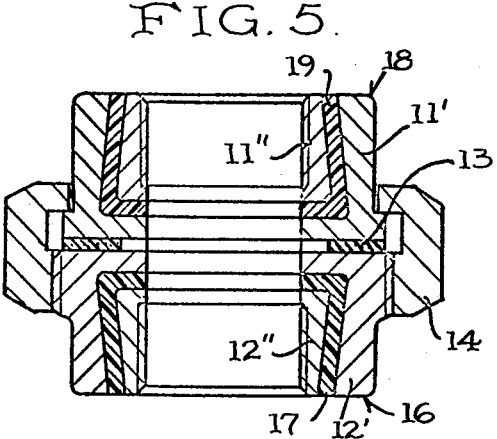
FIGS. 5 and 6 are cross-sectional and end elevational views, respectively, of a different threaded union type coupling embodying the improved insulating concept.
Figure 6:
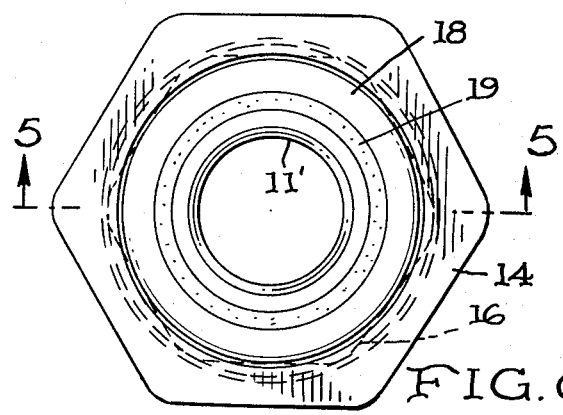

FIGS. 5 and 6 are representative of a two-piece union type coupling, comprising the usual flanged and threaded collar 14 adapted to embracingly connect the axially aligned pieces 16 and 18 in a well-known manner. Each piece 16 and 18 is provided with an insulating layer 17 and 19 respectively, as in the aforedescribed manner.

The purpose of the insulating fittings illustrated is to provide mutual insulation for sections of metallic pipe line networks. Such an insulation is preferably required not only in fuel plants, between tank fuel stations, but also in other installations for transporting liquid media where the passage of electrical overvoltages, failure or leakage potentials, stray currents, etc. between various sections of installations must be effectively prevented. Therefore, the fittings must be provided with a structure which confers to the fittings the capacity of resisting these stresses, and particularly the mechanical stresses occurring during assembly and under operating conditions. The prerequisite here is the requirement that the intermediate insulating layer inserted between the electrically separated junction ends should simultaneously produce a liquid-tight connection which is resistant to vibration fatigue and capable of absorbing bending and temperature stresses.

It is known that the manufacture of a liquid seal for low viscosity media in conjunction with fittings of the present type is not without problems, especially with regard to evolving an economical manufacturing method. In order to provide the economical manufacture of the sealing portions of the components that are to be worked with relatively narrow tolerances, attempts have been made to work the said sealing portions by turning, which proved advantageous particularly in the case of the under-cut or reversely tapered configuration of the socket in the external component (see FIGS. 1, 3, 5 and 14).

In addition to the required resistance against relative turning or twisting, the seal between the outer and inner components or joining parts must also be suitable to resist higher pressures, e.g., of the order of 20–30 times atmospheric. Accordingly, a surface roughness independent of random conditions must be provided at least on the separate fitting component portions adjacent to the intermediate insulating layer in the finished fitting.

According to FIGS. 7–11, such a surface roughness, at least partially obtainable preferably through a form of turning, can be produced in such a manner that the portions to be worked are first provided with a circumferential grooving as fragmentarily shown on an enlarged scale in FIG. 7–9, wherein the intervals X (FIG. 8) from peak to peak and the depth $T_1$ amount, for example, to 0.5  0.8 mm. A second grooving, possibly in the form of a right-angle-ridge knurling indicated by $b$ and $b_1$ in FIGS. 10 and 11, respectively, is applied on the first grooving. As indicated by interrupted line showing in FIGS. 10 and 11, as seen on lines 10—10 and 11—11 of FIG. 7, grooves of triangular cross-section are also produced by the said right-angle-ridge knurling. The angles of pitch inclination designated $\alpha$ and $\beta$ are not of critical importance. Their selection depends preferably upon the diameter of the component portion in question and (since it is not absolutely necessary to arrange a right-angle-ridge knurling) upon the provided number of the second groovings situated transversely in relation to said first groovings. On the other hand, for attaining the desired seal between the intermediate insulating layer, consisting preferably of a synthetic resin, e.g., a polyamide or a polyacetal resin, which is elastic within certain limits and relatively compressible, and the metal components adjacent thereto, it is of essential importance that the first grooving be covered by the second grooving only in part, i.e., a large number of unchanged ridge portions K still remains on every crest U adjacent each circumferential groove, with the minimal length of the said portions K corresponding to approximately double the length of the depression E produced by the second grooving on the ridge U. The depth $T_2$ (FIG. 9) is of critical importance insofar as it may amount to at least approximately the half of $T_1$, and may at the most have the same value as $T_1$. Therefore, it is shown by the invention that a tight insulating fitting of the present invention is no longer secured with a depth relation of $T_2$ being greater than $T_1$ or by $T_2 > T_1$.

Proceeding to FIG. 12, the illustration depicts compositely a slightly different form in its "before" and "after" condition of assembly, with the "before" condition shown to the left side of the center line XX, and the "after" condition shown to the right side thereof. The basic difference of this form, which represents the insulated component of the adaptor fitting in solid lines, is that the two separate body pieces 70 and 72, as well as the insulating insert or medium 74, are all of complementally stepped or shouldered formation. The relatively engaging surfaces are treated as in any of the aforedescribed embodiments prior to assembly which in a known satisfactory method is achieved by the aforesaid suitable expansion of the inner sleeve member 72, and preferably while subjecting them to an axial assembly force, which compresses the insulation material tightly between it and the outer body member 70. In this manner, the insulation material remains free from damage and assures excellent electrical insulating properties.

However, it is important to understand that the said expansion process is preferably performed in two successive steps:
1. The first step comprises imparting a slight expansion force to slightly expand the internal component while in a slightly warmed-up condition of about 80° C.
2. The second step comprises completing the balance of the expansion at approximaterly normal room temperature.

A process is proposed for the economical manufacture and/or assembly of the general type of insulating fittings described. The process is explained below in conjunction with FIG. 13 which represents a semi-schematic illustration of manufacture of an insulating fitting of the type shown completed in FIG. 14. In FIG. 13, a press rammer 21 supporting an expansion mandrel generally designated at 22 also includes a fixedly adjustable pressure plate 23 and an axially movable pressure plate 24, pre-loaded by a compression spring 25, interposed therebetween, and all are mounted on the said mandrel. A jacket or outer sleeve piece, designated by M in FIG. 14, is centered on a device 26 which may be supported, e.g., on the press table. An insulating member 28, which is to later form the intermediate insulating layer of the fitting, and a component 29 constituting a junction end, are all loosely inserted into a socket 27 of jacket piece M, with at least the axially directed inner wall section of the said socket being roughened at least in part in the manner described above.

As seen clearly in FIG. 13, the shape of insulating member 28 and component 29 at this stage of manufacture does not yet correspond to the shape of parts 128, 129, or 132, 133 of FIG. 14. The outer diameter of the major portion of the insulating member 28 having the shape of a cylindrical casing with a transverse bottom portion 28' formed at an end thereof together with a coaxial opening 28" corresponding to the bore of the fitting, corresponds approximately to the diameter of socket 27 in the entry plane on jacket piece M. If permitted by the flexibility of the synthetic resin element, and above all, if the bottom portion thereof allows a folding together, its lower section may be fitted somewhat more satisfactorily to correspond to the shape or outline of socket 27.

The outer wall of opening 27, roughened at least in part in the manner described above, has a cylindrical shape so that the foot portion 30 of component 29 may also pass through the entry zone of opening 27 (in addition to insulating member 28). A central bore 31 in component 29 is provided with a conical narrowing portion 31' in its lower section such that the thickness of the wall increases in the downward direction in that area. The diameter in the upper part of bore 31 corresponds practically to the nominal diameter D of the fitting.

When expansion mandrel 22 is lowered, its entering portion 22' forces the converging foot portion 30 radially outward to such an extent that insulating member 28 is stretched and abuts against the wall of socket opening 27. Owing to friction between mandrel and foot portion 30, the end of the said latter portion is forced simultaneously axially against the bottom portion 28' of insulating member 28. The portions of insulating member 28 situated inside opening 27 are thus forced in intimate contact with the corresponding portions of components M and 29.

Even before the final sizing portion 22" of mandrel 22 reaches the position which previously was the position of origin of foot portion 30, pressure plate 24 reaches the frontal side of component 29 so that the pressure of spring 25, whose initial load is adjustable through a displacement of pressure plate 23 sliding in longitudinal direction on the shaft of the mandrel, begins to exert its axially directed effect on component 29. With the further lowering of mandrel 22, the final sizing portion 22" enters the pre-extended area of foot portion 30 and effects, under the continuously increasing axial pressure applied by spring 25, a gas and liquid-tight contact established by foot portion 30 of component 29, insulating member 28 and the surface of opening 27 in jacket piece M. In this connection, insulating member 28 is not only stretched, but also compressed elastically. Thus, it is capable of following the temporary mutual displacement of components M and 29, occurring with variations in temperature, vibration, etc., and of always producing a reliable seal.

It is to be understood that the illustrated arrangement for spreading the foot portion 30 on component 29 may also be achieved in a different manner. In particular, the transition of the fitting-side end of the mandrel from the entering portion to the sizing portion may be without a shoulder portion and component 29 may be pressed down by a device effective already at the start of the lowering movement of the mandrel. Further, in order to reduce or avoid a radially outward deflection of the end portions of jacket, the said zones may be supported radially during the expanding operation.

According to FIGS. 13 and 14, a further possibility of economization in the manufacture of fittings with double insulation resides in that a component 32 inserted in the lower portion of jacket piece and indicated by an interrupted line and an insulating member 33 may be formed or seated simultaneously and in the same manner as parts 28 and 29 by a second mandrel (provided with suitable equipment) not illustrated and acting in opposition to mandrel 22. The fitting is thus produceable in a single operation.

The fitting illustrated in FIG. 14 as provided with two intermediate insulating layers 128 and 133, was referred to in the explanations relating to FIG. 13. In FIG. 14, the separate parts corresponding to these parts of FIG. 13 are designated by a series of reference numerals increased by the prefix of 100.

The metallic jacket piece M, provided in the example with two equal and coaxial openings 127, embraces two metallic junction ends 129, 132, each separated therefrom by an insulating intermediate layer 128, 133. Basically, this fitting type is a series connection of two fittings illustrated schematically in FIG. 3. In contrast with the fittings having a single insulation segment, this fitting type provides the possibility of measuring the resistance value of the intermediate insulating layer without the necessity of dismounting the fitting in a pipe installation. This is of importance insofar as a parallel resistance formed by the ground is present at the electrical disconnection or points, e.g., in pipes placed underground. As a rule, the said parallel resistance is smaller by orders-of-magnitude than the resistance of a simple, perfect insulating disconnection point. Accordingly, a measurement of resistance without and additional separation segment between the fitting and the pipe network does not produce useful results. Since in the fitting of FIG. 14 jacket piece M is also insulated against the ground, the resistances of the two intermediate insulating layers 128, 133 can be measured separately and reliably, without the necessity of dissassembling parts. Naturally, the same measuring procedure can be carried out also on a disconnection point formed by the coupling joint of FIG. 5.

Accordingly, it is apparent that a novelly improved insulating fitting has been evolved which achieves all the objects and advantages as set forth in the preamble and throughout the specification.

Various changes and alterations may be made, such as the form of an elbow or angle fitting illustrated in FIG. 15, by those skilled in the art, without departing from the spirit and scope of the invention. Reference is to be made to the annexed claims for a limitation of the scope of the invention.

What is claimed is:

1. An insulating pipe coupling fitting for electrically separating end parts of interconnected lengths of metal pipe comprising at least two joined coupling bodies having junction ends for interconnecting adjacently disposed ends of lengths of pipe, and having at least one intermediate layer of insulation arranged between said bodies to electrically separate said junction ends, said coupling bodies each including wall portions defining central flow paths oriented in the axial direction of said junction ends and also wall portions which respectively engage with the intermediate insulation layer, and said latter wall portions having at least in part surface roughened areas which comprise a first surface-indented grooving in a direction transverse to the axial direction of the junction end, and a second ridge knurling type of grooving that is arranged at a right angle relative to and upon said first grooving and whose depth at the most equals that of said first grooving, said bodies and interposed insulation member being unitarily connected together by mechanically applied axial and radial prestressed forces so that a rigid leakproof coupling results, the parts of which are no longer separable without destruction.

2. An insulating fitting as defined in claim 1 wherein said first grooving consists of a groove arranged helically on the said coupling bodies and having a pitch corresponding approximately to the width of the groove.

3. An insulating fitting as defined in claim 2 wherein the cross-section of the first and the second grooves is in the shape of an equilateral or isosceles triangle.

4. A process for assembling an electrically insulating metal pipe coupling or fitting having junction ends, which coupling is unitarily formed from at least two open-ended metal coupling bodies including generally complemental tapered shaped external and internal coaxially apertured bodies and an interposed insulating layer, said bodies and insulation layer having adjacent wall portions extending in both axial and radially transverse directions to the junction ends, said process including the steps of:
  a. roughening at least the axial directed wall portions of each of said coupling bodies;
  b. placing the insulation layer in axial and transverse directions between and so as to be in nested or sandwiched form intermediate said coupling bodies when fully assembled;
  c. placing said coupling bodies so that the internal body is in relatively nested position with the external body by applying an axial force to at least one of said bodies;
  d. applying a radially directed force internally to the internal body member so as to radially expand said internal body member relative to said external body member, simultaneously with and while maintaining the axially applied force to tightly and sealingly interengage said coupling bodies and interposed insulation layer into a unitary completed fitting, the component parts of which are no longer separable without destruction of said fitting due in part to the relative tapering and surface roughening of said walls; and
  e. wherein said axial and radial forces are applied by forcing penetration thereinto of a reciprocable expansion tool, and forcing the assembly of components against a device which will effect an equal and opposite reaction force thereto.

5. A process for assembling an electrically insulating metal pipe coupling or fitting having junction ends, which coupling is unitarily formed from at least two open-ended metal coupling bodies including generally complemental tapered shaped external and internal coaxially apertured bodies and an interposed insulating layer, said bodies and insulation layer having adjacent wall portions extending in both axial and radially transverse directions to the junction ends, said process including the steps of:
  a. roughening at least the axial directed wall portions of each of said coupling bodies;
  b. placing the insulation layer in axial and transverse directions between and so as to be in nested or sandwiched form intermediate said coupling bodies when fully assembled;
  c. placing said coupling bodies so that the internal body is in relatively nested position with the external body by applying an axial force to at least one of said bodies;
  d. applying a radially directed force internally to the internal body member so as to radially expand said internal body member relative to said external body member simultaneously with and while maintaining the axially applied force to tightly and sealingly interengage said coupling bodies and interposed insulation layer into a unitary completed fitting, the component parts of which are no longer separable without destruction of said fitting due in part to the relative tapering and surface roughening of said walls; and
  e. wherein the radially expanding part of the paragraph (d) process is perofrmed in two further steps comprising:
    1. initially slightly expanding the internal fitting in a slightly warmed-up state of about 80° C.; and
    2. completing the expansion at approximately normal room temperature.

* * * * *